United States Patent
Mikhelson et al.

(10) Patent No.: US 12,103,649 B2
(45) Date of Patent: Oct. 1, 2024

(54) METHOD FOR FABRICATION OF AN INTEGRATED PRODUCTION COMPLEX ON A GRAVITY-BASED STRUCTURE (GBS)

(71) Applicant: Publichnoe Aktsionernoe Obshchestvo "NOVATEK", Tarko-Sale (RU)

(72) Inventors: Leonid Viktorovich Mikhelson, Moscow (RU); Valeriy Nikolaevich Retivov, Moscow (RU); Sergey Gennadyevich Solovyev, Novyy Urengoy (RU)

(73) Assignee: Publichnoe Aktsionernoe Obshchestvo "NOVATEK", Tarko-Sale (RU)

( * ) Notice: Subject to any disclaimer, the term of this patent is extended or adjusted under 35 U.S.C. 154(b) by 0 days.

(21) Appl. No.: 18/580,772

(22) PCT Filed: Jul. 14, 2022

(86) PCT No.: PCT/RU2022/000226
§ 371 (c)(1),
(2) Date: Jan. 19, 2024

(87) PCT Pub. No.: WO2023/009032
PCT Pub. Date: Feb. 2, 2023

(65) Prior Publication Data
US 2024/0262470 A1     Aug. 8, 2024

(30) Foreign Application Priority Data
Jul. 30, 2021   (RU) .......................... RU2021122903

(51) Int. Cl.
*B63B 73/10* (2020.01)
*B23P 21/00* (2006.01)
(Continued)

(52) U.S. Cl.
CPC .............. *B63B 73/10* (2020.01); *B63B 73/30* (2020.01); *B23P 21/004* (2013.01); *E02B 2017/0069* (2013.01); *E02B 17/025* (2013.01)

(58) Field of Classification Search
CPC ................ B23P 21/004; E02B 17/025; E02B 2017/0069; E02D 27/52; B63B 35/44;
(Continued)

(56) References Cited

U.S. PATENT DOCUMENTS

| | | |
|---|---|---|
| 2018/0224204 A1 | 8/2018 | Faka et al. |
| 2020/0032473 A1 | 1/2020 | Berenguer Cobián |

FOREIGN PATENT DOCUMENTS

| | | | | |
|---|---|---|---|---|
| CN | 102337736 A | * | 2/2012 | |
| FR | 2595106 A | * | 9/1987 | ......... E02B 17/0021 |

(Continued)

OTHER PUBLICATIONS

International Search Report in PCT/RU2022/000226, mailed Dec. 1, 2022.

*Primary Examiner* — Matthew P Travers
(74) *Attorney, Agent, or Firm* — Collard & Roe, P.C.

(57) ABSTRACT

Topside modules are fabricated at a production site using as a foundation for installation a gravity-based structure (GBS), which can stay afloat during water transportation. Modules fabrication includes: Stage I, fabrication of components; Stage II, fabrication of nodes from the components; Stage III, fabrication of sub-assemblies from the nodes; Stage IV, shotblasting and painting of assemblies; and Stage V, assembling modules from the assemblies. Then modules transportation, movement to their seats on the GBS and their integration include: Stage VI, moving the modules to an area near the dock using self-propelled vehicles. Stage VII, moving each module onto guides of a lifting system installed in a dry dock. Stage VIII, lifting each module until lifting system guides are connected with GBS top slab guides.

(Continued)

Stage IX, moving each module to its seat on the GBS, installed on the GBS and integrated with other modules and the GBS.

17 Claims, 10 Drawing Sheets

(51) Int. Cl.
*B63B 73/30* (2020.01)
*E02B 17/00* (2006.01)
*E02B 17/02* (2006.01)

(58) Field of Classification Search
CPC ... B63B 2035/448; B63B 73/20; B63B 73/30; B63B 73/60
See application file for complete search history.

(56) References Cited

FOREIGN PATENT DOCUMENTS

| | | |
|---|---|---|
| FR | 3 062 407 A1 | 8/2018 |
| RU | 2 441 799 C2 | 2/2012 |
| RU | 2 707 205 C2 | 11/2019 |

* cited by examiner

METHOD FOR FABRICATION OF AN INTEGRATED PRODUCTION COMPLEX ON A GRAVITY-BASED STRUCTURE (GBS)

CROSS REFERENCE TO RELATED APPLICATIONS

This application is the National Stage of PCT/RU2022/000226 filed on Jul. 14, 2022, which claims priority under 35 U.S.C. § 119 of Russian Application No. 2021122903 filed on Jul. 30, 2021, the disclosure of which is incorporated by reference. The international application under PCT article 21 (2) was not published in English.

TECHNICAL FIELD

The invention pertains to construction of production facilities and can be used as a part of construction of production complexes intended for hydrocarbon processing, storage, and offloading of the processed products (including, but not limited to, natural gas liquefaction plants, ammonia plants, hydrogen plants, as well as power plants) on gravity-based structures (GBS).

BACKGROUND ART

One of the following two methods is currently used to build near-shore and offshore hydrocarbon processing plants, in particular natural gas liquefaction plants (LNG plants).

The most common method is building LNG plants on pile foundations, on which process equipment and structures of a plant are accommodated. For plants to be built in a permafrost area, pile foundations for the plant structures are coupled with soil thermostabilizers. LNG plants are typically installed near a shore to be able to ship the products by sea. Among other things, the plants comprise LNG storage tanks and LNG jetties also accommodated on pile foundations, with the LNG plant and LNG tanks erected on the shore, and a jetty for LNG offloading with necessary process equipment installed in the near-shore waters. The LNG plant, the tanks, and the offloading jetty are interconnected by pipelines mounted on piperacks erected on pile foundations for LNG transfer to dedicated gas carriers.

In order to build an LNG plant on a pile foundation, necessary infrastructure to deliver personnel, construction materials and supplies, accommodate construction workers, store the materials, and operate construction equipment, including temporary roads, all the necessary utilities, and infrastructure facilities, is typically developed on a construction site. If an LNG plant is to be built at a remote field, especially one with extreme environmental conditions, preparation of infrastructure for construction activities is time-consuming and costly.

A common construction method for LNG plants on pile foundations features the following disadvantages:
 long period of infrastructure development ahead of construction activities;
 soil thermostabilizers costs for construction in a permafrost area;
 costs to mobilize and demobilize construction personnel, equipment, and machines;
 the need to ensure that large construction teams can stay and work at the construction site, which is often locates in a remote and underdeveloped area with extreme environmental conditions;
 costs to ensure that construction materials, LNG plant's equipment, and supplies can be delivered regularly to the construction site, which often features limited accessibility by transport,
 costs to dismantle construction infrastructure and recultivate disturbed lands after construction completion,
 environmental impact due to extensive preparation and construction activities at the LNG plant site.

Another method is building LNG plants on a floating base. In this case, the LNG plant is a part of a floating unit that produces, treats, and liquefies natural gas, as well as stores and offloads LNG. Floating units for production, storage, and offloading of LNG (FLNGs) are used for offshore gas field developments and is installed directly at the offshore field using anchoring and/or mooring. Such floating unit is not used in offshore locations with heavy ice conditions since their reliable positioning necessary to connect to valves on underwater pipes is impossible due to drifting ice.

LNG plants on floating substructures are built at shipyards. Floating substructures are made from steel by welding steel members. The LNG plant's equipment is manufactured at a dedicated site and is then delivered to the shipyard by sea or by land.

The advantage of having the construction activities be done at a shipyard is that the full cycle of construction and erection, except for FLNG installation at the field, can be completed at a fabrication yard that has all the necessary equipment, infrastructure, permanent direct workforce, and a well-established procurement and supply system. Another advantage of shipyards is an in-line production process wherein steel structures of floating substructures are manufactured using highly productive stationary equipment.

That being said, FLNG applications are limited to offshore field development projects in ice-free seas, while the method for building LNG plants at shipyards features the following disadvantages:
 high construction costs caused by using a floating substructure made from steel,
 long construction duration due to labor intensity,
 complicated equipment installation process to ensure FLNG hook-up to underwater pipes.

There exists a method for building a floating structure for a semi-submersible platform, for instance an oil & gas platform, comprising a superstructure mounted on support columns and pontoons in a dry dock with an adjacent yard, wherein the pontoons are put in the dry dock, then columns are erected thereon and a service rack in between, while the superstructure is built at the adjacent yard and then moved onto the columns via the rack and connected to them, with the columns and the rack being initially erected to the level of the adjacent yard, and with the dock then being flooded once the superstructure is moved onto the columns, thus ensuring the pontoons holding the columns and the superstructures become afloat, whereafter the rack is erected to the level of the superstructure, the water is removed from the dock, with the pontoons holding the columns settling on the dock bottom, and the columns are further erected to reach the level of the superstructure (patent for invention RU 2441799 C2, publication date: Feb. 10, 2012).

This method features the following disadvantage:
 the superstructure is installed as a single unit, which limits its size and weight,
 installing the superstructure as a single unit means that a large number of self-propelled trailers needs to be engaged at the same time, the service rack has to be large enough and have high load-carrying capacity, the superstructure's design needs to provide for it to be supported both by the columns and the rack upper deck (alternating between the two support methods), which translates into greater material capacity for the structure to meet the strength and rigidity requirements.

A method, which is the closest to the proposed one, features integrated construction and installation of equipment of an upper process unit of a floating facility (patent for invention RU 2707205 C2, publication date: 19 Jul. 2019), which is carried out at a smart shipyard, which combines a plant of modules for sea construction and shipyard, and mainly comprising the following stages:

Stage S1, during which construction of the upper process unit of the floating facility is performed to develop a complete utility module and a process module;

Stage S2, during which the upper process unit of the floating facility is transported on a flatcar as a single piece to a final assembly area for integrated installation;

Stage S3, during which the complete utility module and the process module are installed on a ship hull using a jacking and skidding system, with the upper process unit being loaded off the flatcar as a single piece onto a lifting system installed in an area near the dock and, once lifted, moved horizontally onto a ship via an interconnecting bridge erected between the lifting system and the ship hull, Stage S4, during which the overall adjusting and start-up are carried out.

A disadvantage of this method is that moving the superstructure as a single piece means there is a size and weight limitation and reinforcement is required for the superstructure construction. Furthermore, the superstructure is moved as a single piece to the place of its installation onboard the ship using permanent rail tracks, where the whole superstructure stops moving in case an engine or the flatcar break down. In addition, in order to install the lifting system in the area near the dock, a special bridge is required between the lifting system and the ship for horizontal movement of the superstructure onto the ship.

SUMMARY OF THE INVENTION

The technical problem resolved with the invention is as follows.

Given the above and the increased share of natural gas produced from the Arctic fields, there is an urgent need to develop a new efficient way to build a raw hydrocarbons processing complex adapted for use in Arctic conditions in water areas with ice regime.

To address the described problem, it is proposed a method for for fabrication of an integrated production complex on a gravity-based structure (GBS). A gravity-based structure is a volumetric reinforced-concrete structure serving as a storage for raw materials produced and processed, as well as for auxiliary substances and materials. It underlies topsides of the production complex and is designed to be installed on a bottom of a water body under its own weight. A GBS can stay afloat during water transportation to the site of the integrated production complex and can withstand ice impact in ice conditions.

Construction of production complexes on GBS will solve challenges caused by extended and costly works to get prepared for the construction and to build a piled plant, as well as by the fact that it would not be possible to use such plant on a floating structure to develop fields in waters with ice conditions.

The suggested method can also be used when building integrated GBS complexes to generate power with thermal energy from natural gas combustion. Such complexes can receive liquefied natural gas (LNG) from specialized gas carriers, store it, regasify and convert it to power. The technical result achieved with the invention consists in construction of a production complex which can be built at a specialized fabrication site with dry dock(s) using gravity-based structure which can withstand ice impact in ice conditions, as well as in providing better maneuverability during movement of individual topside modules on the territory of the fabrication site and in eliminating the need for special bridge structures to install topsides on the foundation.

The technical result is achieved through the method of fabrication of the production complex, in which topside modules are fabricated at the production site, including stages of fabrication, abrasive cleaning and painting of sub-assemblies and assembly of modules, the modules are transported to a location of a foundation and are moved to their seat on the foundation which is located in a dry dock, and then the modules are integrated with the foundation and with one another, characterized in that a gravity-based structure (GBS) is used as the foundation, said GBS being able to stay afloat during transportation to the GBS installation site, herewith fabrication of the modules includes the following stages:

Stage I, at which components are fabricated,

Stage II, at which nodes are fabricated from the components,

Stage III, at which sub-assemblies are fabricated from the nodes,

Stage IV, at which abrasive cleaning and painting of the sub-assemblies is carried out, and Stage V, at which assembly of the modules from the sub-assemblies is carried out, then transportation of the modules, movement to their seats on the GBS and their integration include the following stages:

Stage VI, at which the modules are transported to an area near the dock with the help of self-propelled vehicles, Stage VII, at which each module is moved onto guides of a lifting system installed in the dry dock, Stage VIII, at which each module is lifted until the lifting system guides are connected with guides on a top slab of the GBS, Stage IX, at which each module is moved to its seat on the GBS, installed on the GBS, and the modules are integrated with one another and with the GBS.

The following procedure of Stages is preferred.

Stage I is implemented at a components fabrication site at which materials and the components are moved along components fabrication lines by means of a lifting and transporting equipment.

Stage II is implemented at a site for assembly the nodes and sub-assemblies, with the lifting and transporting equipment being located at an area at the boundary of the components fabrication site and along the site for assembly the nodes and sub-assemblies.

Overhead cranes are used as lifting and transporting equipment in the site for assembly of the nodes and sub-assemblies, and semi-gantry cranes are used in the area at the boundary of the components fabrication site, besides the components are moved from the components fabrication site to the site for assembly of the nodes and sub-assemblies with self-propelled vehicles, the nodes are fabricated at a nodes fabrication area where the components and nodes are moved with the semi-gantry cranes, and then the nodes are moved to a sub-assemblies fabrication area with the overhead cranes.

At Stage II, supports of semi-gantry cranes are located outside a component movement route from the component fabrication site to the site for assembly of the nodes and sub-assemblies.

Stage III is implemented at the sub-assemblies fabrication area of the site for assembly of the nodes and sub-assemblies, where the nodes are moved with the bridge cranes, and then the sub-assemblies are moved by self-propelled vehicles to a sub-assemblies shot blasting and painting site.

Stage IV is implemented at the sub-assemblies shot blasting and painting site, and thereafter the sub-assemblies are moved by self-propelled vehicles to a modules assembly site.

Sub-assemblies are moved from blasting chambers to painting chambers and to the module assembly site through enclosed corridors with roofs and sliding gates.

Stage V is implemented at the modules assembly site which has parallel bays, each bay being provided with lifting and transporting equipment to move sub-assemblies along the bays and transversely.

At Stage V, each assembly area of the modules assembly site is a slipway with a set of support systems vertically integrated into the inter-column space of the said site.

At Stage VI, modules fabricated outside the fabrication site are also moved to the area near the dock.

At Stage VI, the modules fabricated outside the fabrication site are shipped to a berth area, from which the modules are moved to the area near the dock by self-propelled vehicles after unloading.

At Stage VII, each module is moved horizontally onto the guides of the lifting system installed in the dry dock with hydraulic sliders installed on rails.

At Stage VIII, each module is lifted with vertical jacks of the lifting system until the lifting system guides and the GBS guides match.

At Stage IX, modules are skidded to the seats on the GBS with hydraulic sliders.

At stage IX, the modules are installed on the GBS using vertical jacks integrated into the hydraulic sliders.

At Stage IX, individual tests are performed in parallel with the modules integration with one another and the GBS as the first stage of commissioning works.

EXAMPLES OF IMPLEMENTATION OF THE INVENTION

Figure 1:
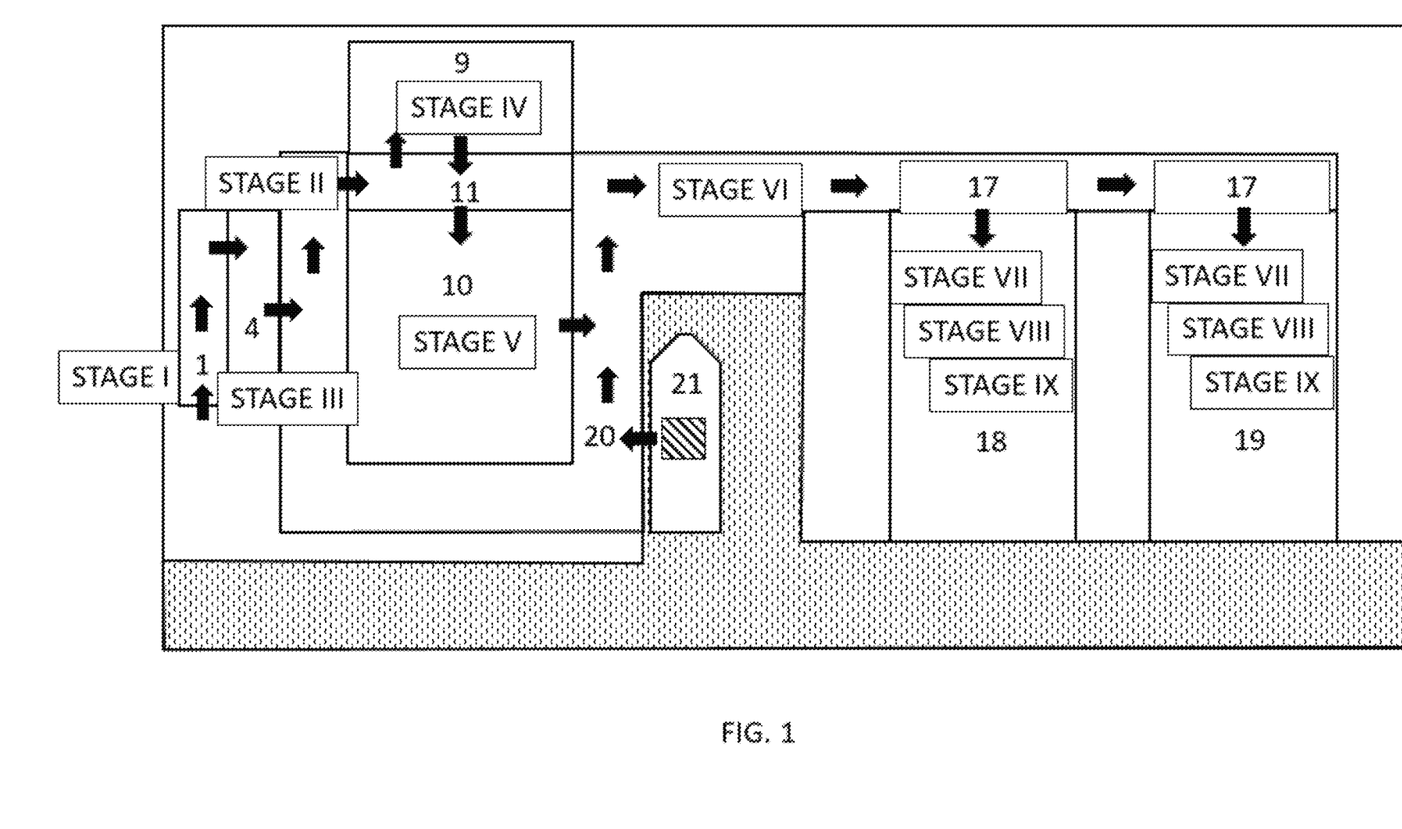
FIG. 1 shows a layout of modules fabrication sites as well as their movement route across a territory of buildings and the production site.

The method for integrated fabrication of a production complex on a gravity-based structure is implemented as follows. The production complex construction workflow comprises five key fabrication stages and four stages of moving the modules and installing them on the GBS (FIG. 1). The workflow is intended to ensure that components, nodes, sub-assemblies, and finished products (modules) are moved around in the optimal way.

The topside modules are volumetric steel frames with bracings, which accommodates process equipment, electrical equipment, automation systems, etc. At a fundamental level, the topside modules are not different from topside modules used in the oil & gas sector in terms of their design, contents, and layout. The number of topside modules is determined during the production complex engineering phase.

The fabrication plan implies serial fabrication of modules at the production site intended specifically for fabrication of integrated production complexes on GBS. With the help of technology solutions, all necessary technical conditions and requirements for each specific fabrication stage can be implemented within a separate building at the production site.

Components, nodes, and sub-assemblies are manufactured within a single building at the production site.

Figure 2:
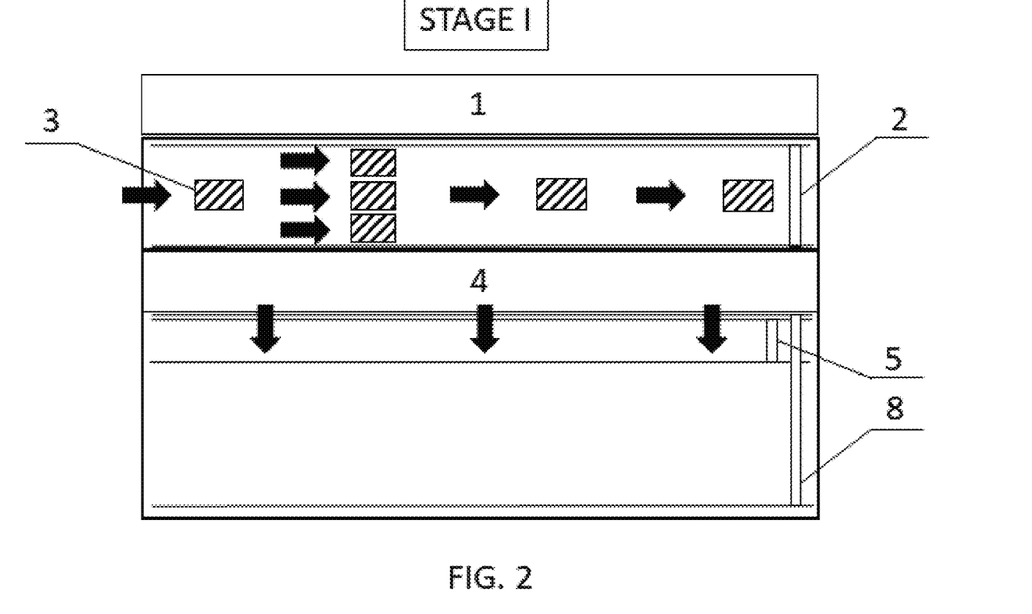
FIG. 2 shows a workflow of Stage I inside the components fabrication site.

Stage I activities are performed within a components fabrication site 1, which features a conveyor-type layout. This site is equipped with lifting and transporting equipment, preferably overhead cranes 2, to help materials and components move through a technological route (FIG. 2). Stage I comprises three fabrication processes to manufacture components 3 (components from rolled steel sheets, shells, and beams), implemented as several, e.g. three, manufacturing lines in a parallel arrangement all across the fabrication site. Finished components 3 are moved using self-propelled vehicles to a site 4 for assembly of nodes and sub-assemblies where other lifting and transporting equipment, preferably semi-gantry cranes 5 designed to enable swift and safe moving of the components 3 and nodes 6 all across the site, operates.

Figure 3:
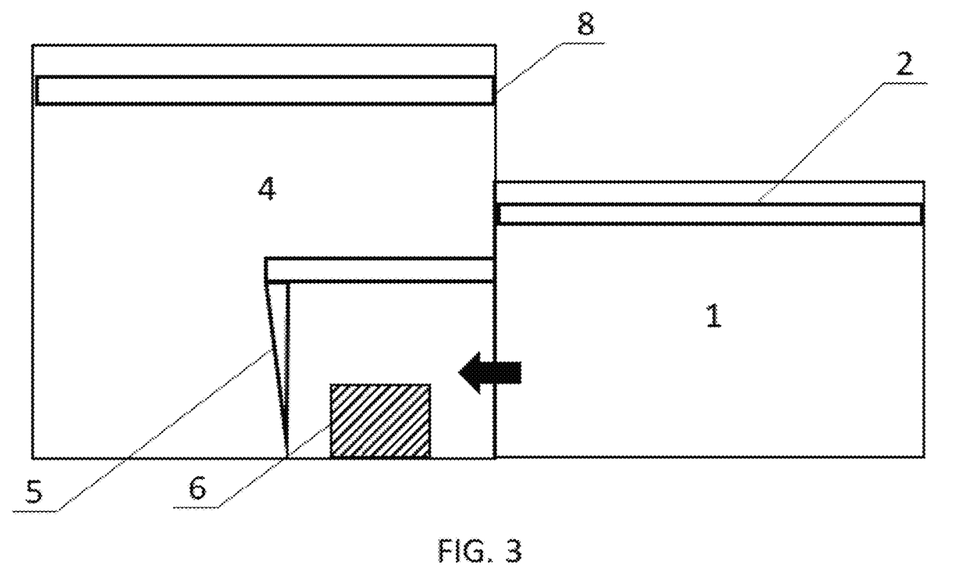
FIG. 3 shows a side view of the bay layout inside the module assembly site and the site for assembly of the nodes and sub-assemblies.

The semi-gantry cranes 5 are arranged so that one leg of each crane is placed on a rail beam over a road from the components fabrication site 1 to the site 4 for assembly of nodes and sub-assemblies in an unobstructive manner so as to ensure a free movement of the components 3 from the components fabrication site 1 to the site 4 for assembly of nodes and sub-assemblies carried by the self-propelled vehicles thus enabling swift and safe transporting of components 3 (FIG. 3).

Self-propelled vehicles may be self-propelled trailers and/or platforms.

Figure 4:
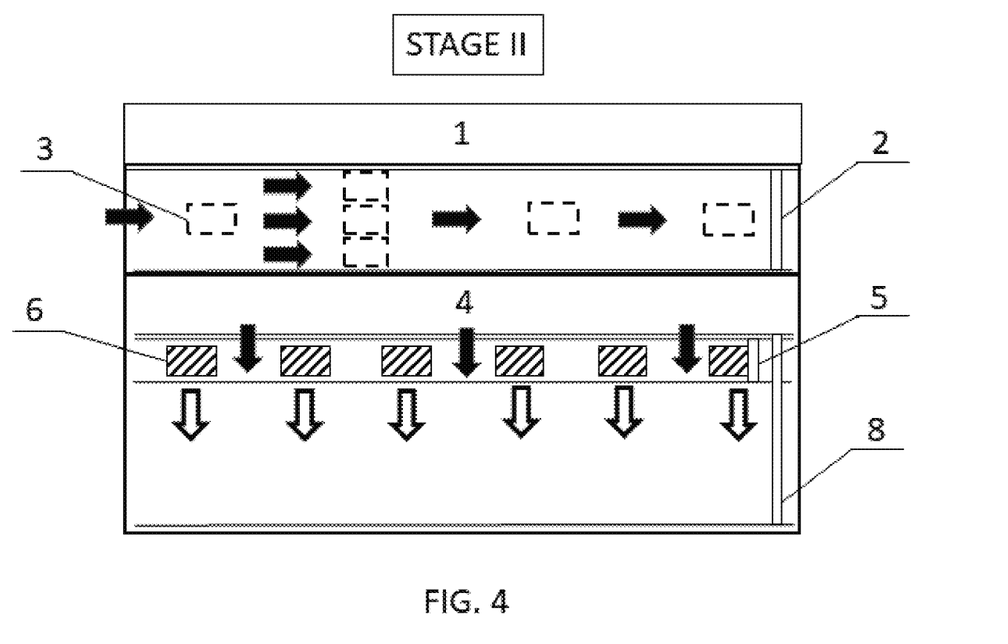
FIG. 4 shows a workflow of Stage II inside the site for assembly of the nodes and sub-assemblies.

Stage II, which consists in fabrication of the nodes 6 (e.g. H-beams and shells) that, when finished, are moved to a sub-assembly fabrication area using overhead cranes, starts within the site 4 for assembly of nodes and sub-assemblies (FIG. 4). There is an area at a boundary of the components fabrication site 1 along the site 4 for assembly the nodes and sub-assemblies, which is equipped with the semi-gantry cranes 5 to handle nodes 6 all across the site so that they can be used in fabrication processes in any of the site bays.

One of the features of Stage II is that the operating area of the semi-gantry cranes 5 stretches all along the site 4 for assembly the nodes and sub-assemblies enabling the assembly of nodes 6 in direct vicinity of the relevant sub-assemblies fabrication location.

Figure 5:
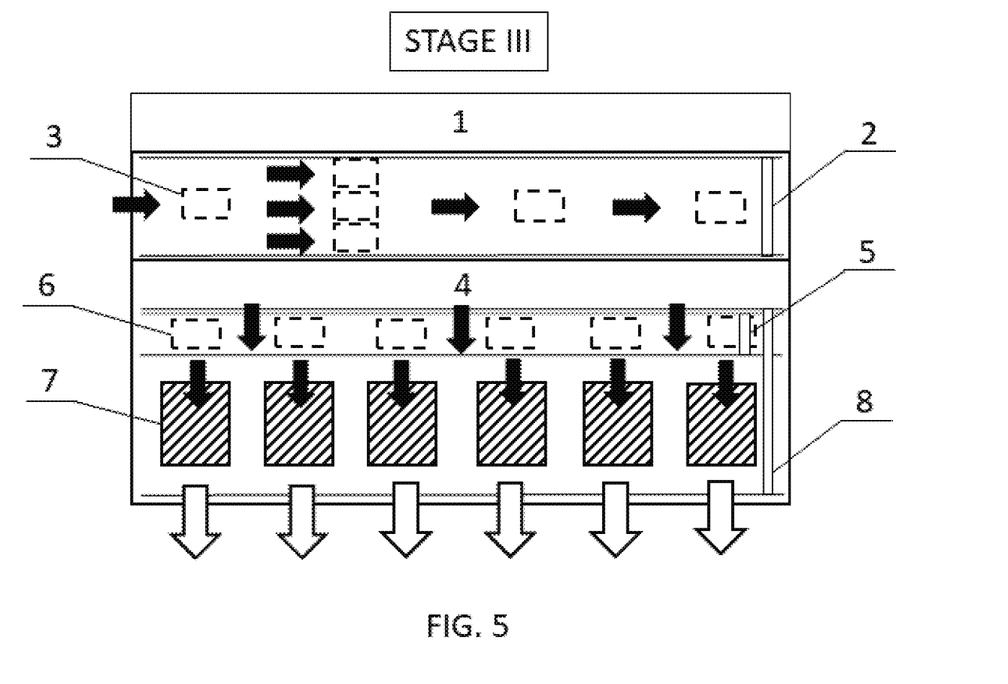
FIG. 5 shows a workflow of Stage III inside the site for assembly of the nodes and sub-assemblies.

Stage III activities are performed within the site 4 for assembly of the nodes and sub-assemblies (FIG. 5) and consist in fabricating sub-assemblies 7 (metal structure sections). For the nodes transporting purposes within said site overhead cranes 8 are installed that have the entire site within their reach and are used to handle the nodes 6 all across the site. Overhead cranes 8 are located perpendicularly to the movement direction of the semi-gantry cranes 5 making the entire width of a sub-assembly fabrication area available without any additional rigging. Once finished, the sub-assemblies 7 are moved by self-propelled vehicles (not shown) to a shot blasting and painting site 9.

Figure 6:
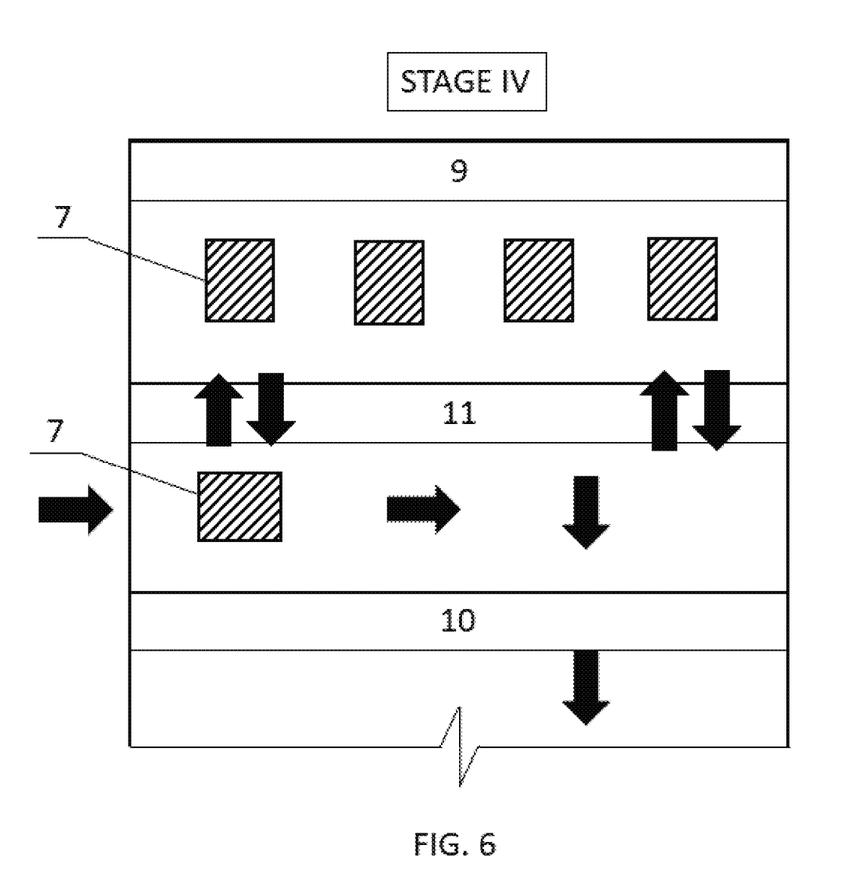
FIG. 6 shows a workflow of Stage IV inside the shot blasting and painting site.

Stage IV. Once finished, sub-assemblies 7 are moved to shot blasting and painting site 9 (FIG. 6). The site comprises a shot blasting chamber and several, e. g. three, painting chambers (not shown). The route for transporting the sub-assemblies 7 from the shot blasting chamber to any of the three painting chambers as well as to a module assembly site 10 has a sheltered part 11 (gallery, roof, and sliding gate) to avoid any weather impact on the sub-assemblies 7, thus ensuring that shot blasting and coating process requirements are met. To move the sub-assemblies 7 between the sites, self-propelled vehicles are used.

Following shot blasting and painting, the sub-assemblies 7 are moved by the self-propelled vehicles to a module assembly site 10 where Stage V is carried out, which is the final stage consisting in fabrication of modules 12. The shot blasting and painting site 9 and module assembly site 10 are linked by a common sheltered gallery 11 to avoid any environmental impact on a painted sub-assembly 7 as well as to move the sub-assemblies 7 from the shot blasting chamber to the painting chamber and then to the module assembly site 10 using self-propelled vehicles without facing any consequences of environmental impacts.

Stage V. Module assembly. The module assembly site 10 (FIG. 7) is intended for construction of large-scale process modules 12 and is split into several bays, which can accommodate two or three modules 12 each if the work is to be done in parallel. Each bay is equipped with overhead cranes 13 and 14 of different lifting capacity moving along the whole bay. The overhead cranes 13 are designed for equipment installation, and the larger capacity overhead cranes 14 are designed for movement of assemblies.

Figure 7:
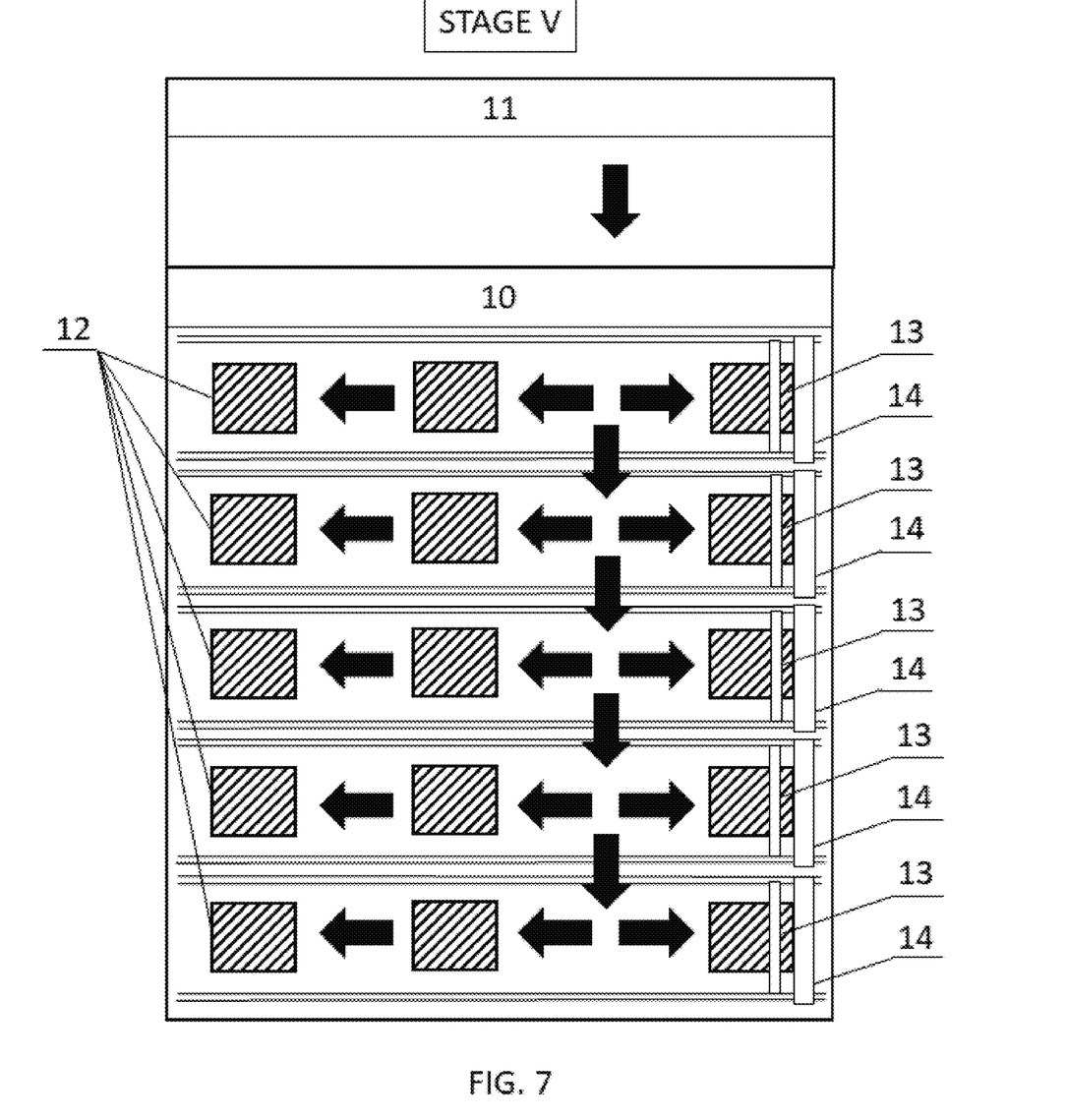
FIG. 7 shows a workflow of Stage V inside the module assembly site.

Upon expiration of a required time period for drying of a coating at the shot blasting and painting site 9, the ready-made sub-assembly 7 (metal structure section) is moved to one of the bays of the module assembly site 10 for assembly of the process module 12. The module 12 is assembled on special supports of required size in order to distribute loads to make sure they do not exceed the design values. The supports shall stand on foundations with increased bearing capacity. The modules 12 are assembled in stages, each section of sub-assemblies 7 (metal structure) is installed on an already installed section.

Figure 8:
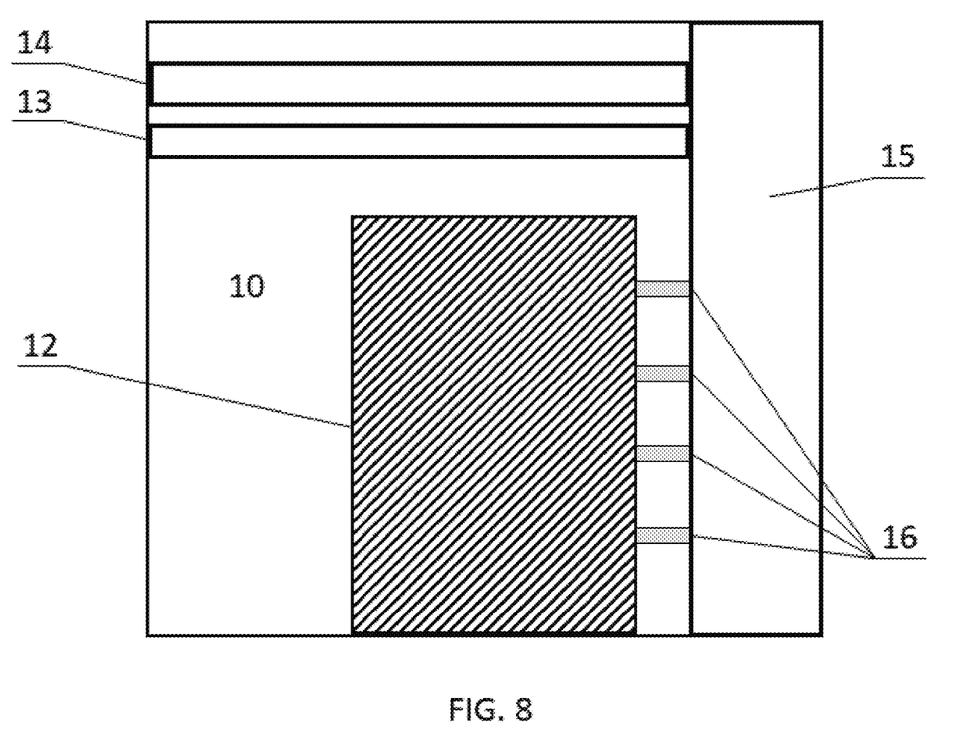
FIG. 8 shows the side view of the bay layout inside the module assembly site.

Each assembly area of the modules assembly site 10 is a slipway with a set of support systems vertically integrated into the inter-column space 15 of the said site. Assembly platforms with transition ramps (FIG. 8) are integrated into the inter-column space as well, thus eliminating need for additional means to access upper levels of the product (scaffolding). Within each assembly area, activities to assemble the module 12 and install process equipment and piping inside the module are carried out.

The said site layout enables moving of each individual module 12 within the site irrespective of where all modules 12 are located within the site.

Once the work at the site is completed, the module 12 is moved to an area 17 near the dock for further installation onto the gravity-based structure (GBS).

Stage VI. The module 12 is moved by self-propelled vehicles (FIG. 9) from the module assembly site 10 to the area near the dock 17. Self Propelled Modular Trailers (SPMTs) are used at this stage (not shown in the drawings).

Figure 9:
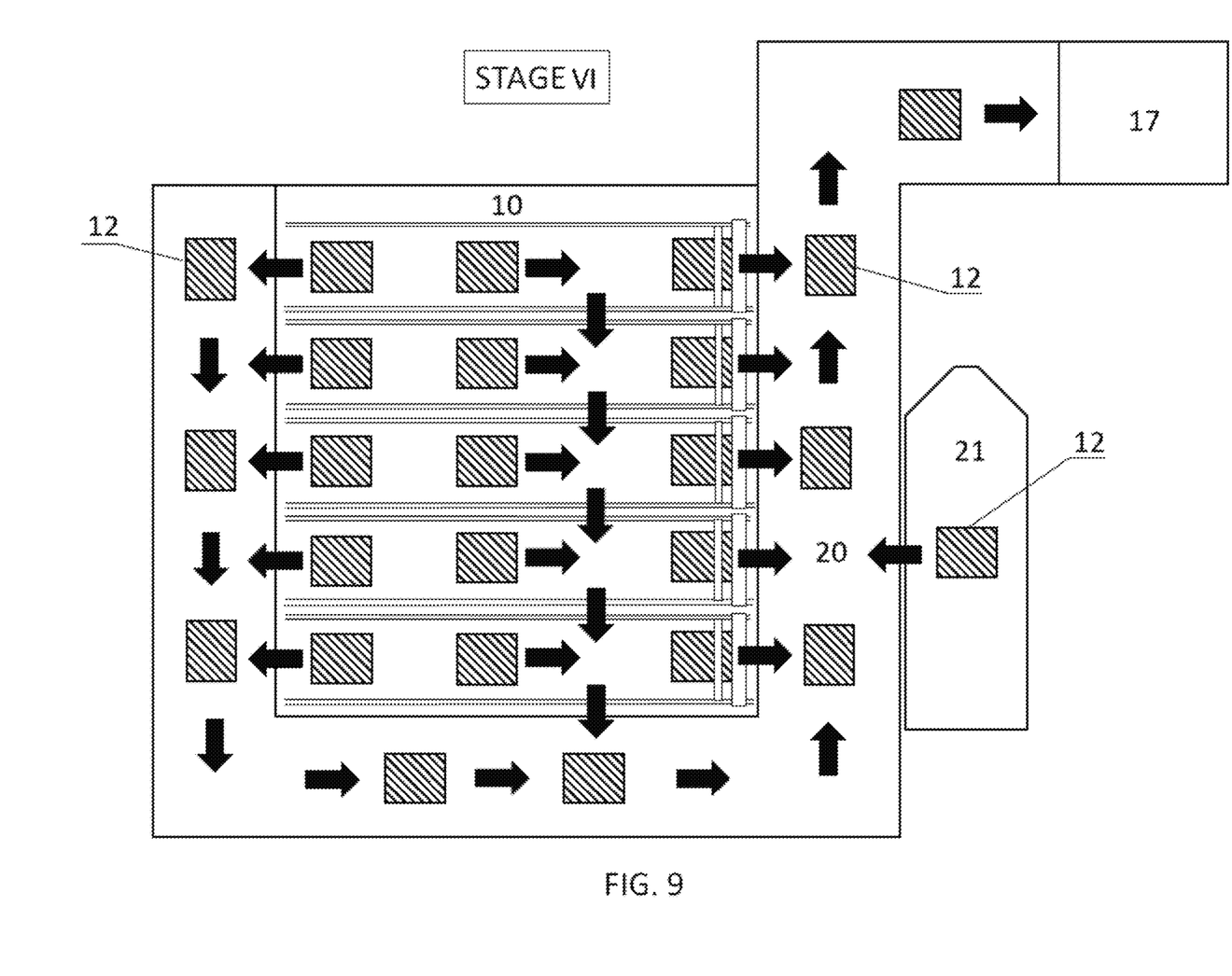
FIG. 9 shows a workflow of Stage VI on a route between the module assembly site and the area near to the dock.

The following operations are performed during transportation of the module:

combining and arranging SPMTs with variable road clearance as per geometrical dimensions of the module being transported;

putting the combined SPMTs under the module installed on supports in the assembly site; SPMTs road clearance is set to the minimum at this point;

the SPMTs increase the road clearance with the help of a built-in hydraulic drive, causing the upper (bearing) part of the SMPT to meet the lower part of the module 12, raising it above the supports;

the SMPTs transport the module 12 to one of dry docks 18 or 19 using a special road, bearing capacity, slant, and turning radii of which allow for movement of the SPMTs arranged as per the geometrical dimensions of the module being transported, and moving synchronously;

the SPMTs position the module 12 on supports above guides of a a hydraulic horizontal movement system within the area near the dock by positioning the module above the supports and then reducing the road clearance, causing the module to rest on the supports, while the SPMTs move away from under the module after reducing the road clearance to the minimum.

If needed, the topside modules shall be temporarily placed at one of module storage sites close to the dry dock. This is done similarly to the procedure described above, but at the last step the module is placed on the supports provided in the module storage sites instead of the supports above the guides of the hydraulic horizontal movement system. After the storage period is over, the process equipment module shall be taken out of the storage site by performing the above procedure and installed on the supports above the guides of the hydraulic horizontal movement system in the area near the dock.

Stage VI may involve a module (modules) manufactured outside of the production site. Marine delivery of the modules is possible due to berth area 20 for offloading and engagement in stage VI of the module transportation to the area near the dock 17 (FIG. 9). In this case, transportation of the modules 12 from the berth area to the area near the dock is also performed with the use of SPMTs with the following operations performed:

installation of removable ramps between the berth and a vessel deck 21;

combining and arranging SPMTs with variable road clearance as per the geometrical dimensions of the module being transported;

moving the SPMTs under the module located on supports on the vessel deck with the SPMTs road clearance set to the minimum; the SPMTs shall be moved onto the vessel deck using removable ramps;

the SPMTs placed under the module between the supports on the vessel deck increase the road clearance with the help of built-in hydraulic drive, causing the upper (bearing) part of the SMPT to meet the lower part of the module, raising it above the supports;

the SPMTs with variable road clearance drive from the vessel deck to the berth via the removable ramps, thus transporting the module to be transported;

after that, further transportation is performed similarly to transportation of modules from the module assembly site.

Figure 10:
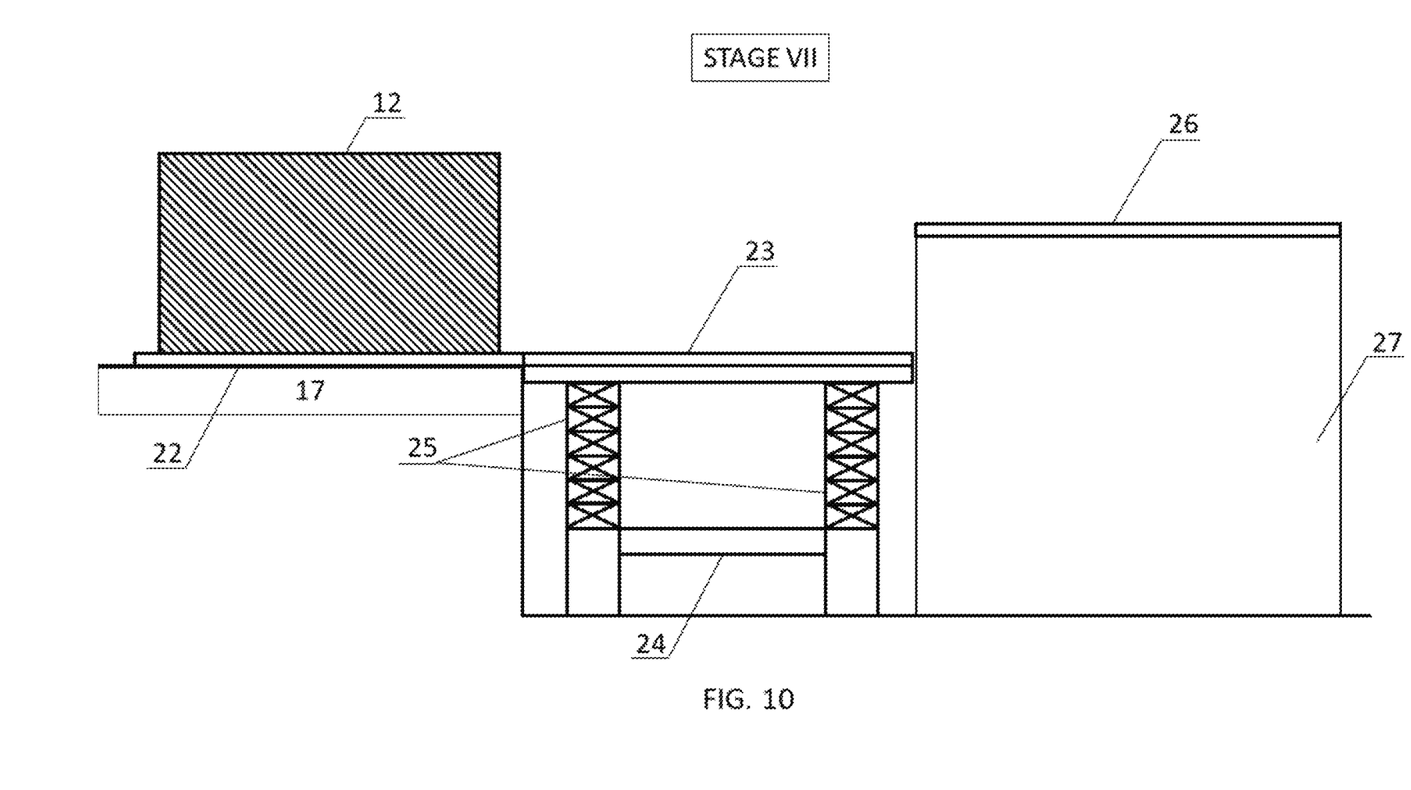
FIG. 10 shows a workflow of Stage VII for moving the module from the area near the dock onto the lifting system.

Stage VII. Verification and outfitting of the modules 12 with special tools for transportation to a lifting system from the area near the dock. Each line of a transportation system is equipped with guides 22 located within the area near the dock 17 (FIG. 10). The SPMTs deliver the modules 12 to the area near the dock and install them on the supports over the guides 22. The module is transported to the guards of the lifting system with the help of a hydraulic skidding system. The hydraulic system comprises hydraulic sliders (not shown in the drawings) which are mounted on guides 22 (rails) and include horizontal jacks as well as vertical jacks for adjusting the height of the sliders. The guides 22 ensure anti-friction sliding of the slider and the module 12. The sliders are driven at the resting points of the module 12 under the module 12 mounted on supports above the guides 22. The sliders are combined in a single control circuit. After the sliders are installed, the module 12 is lifted and detached from the supports to a safe height. Next, vertical jacks are used to raise the slider base plates until they rest against the module and to horizontally move the module 12 onto guides 23 of the lifting system 24 using the horizontal jacks of the sliders.

Figure 11:
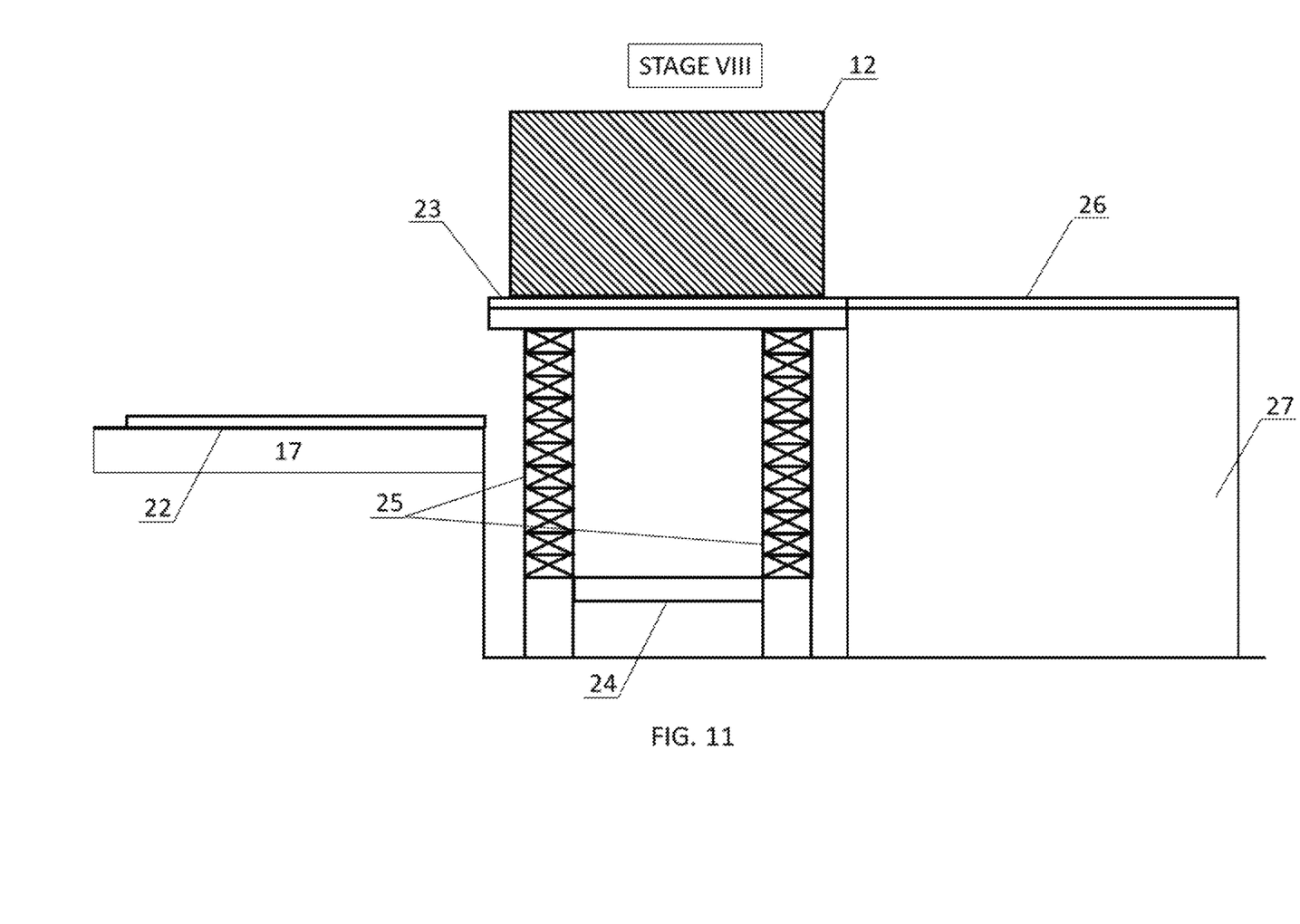
FIG. 11 shows a workflow of Stage VIII for lifting the module using the lifting system.

Stage VIII. The lifting system 24 is located at the bottom of the dry dock 18 or 19 on support columns 25, each having a vertical jack on it. The columns 25 have guides 23 mounted on them. The module 12 is lifted using vertical jacks to connect the guides 23 of the lifting system with guides 26 located on the top slab of the GBS 27 (FIG. 11).

Figure 12:
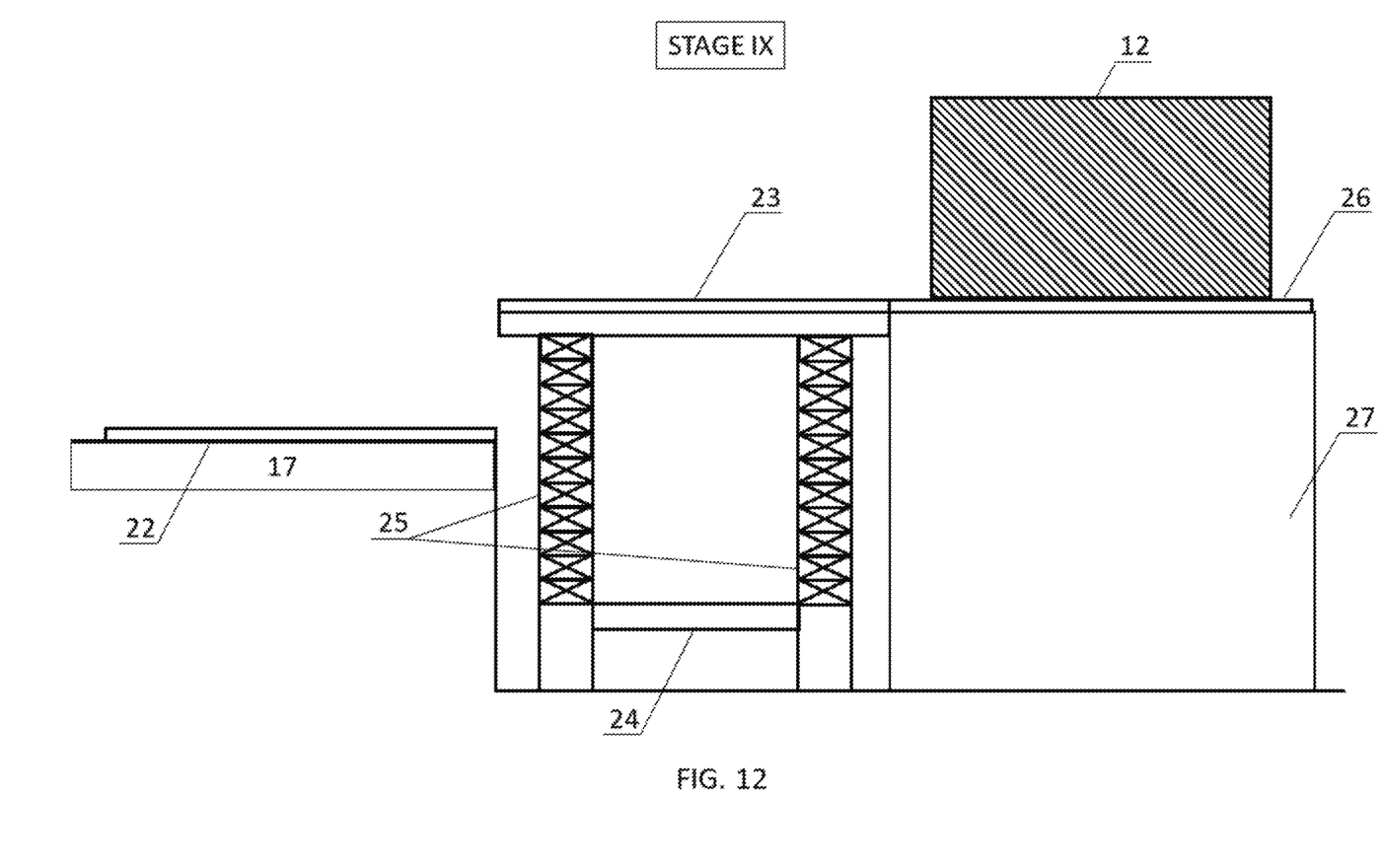
FIG. 12 shows a workflow of Stage IX for moving the module from the lifting system onto the GBS.

Stage IX. After lifting the module 12 and connecting the guides 23 and 26, the module 12 is moved by hydraulic sliders to a desired location on the GBS 27 and installed in the design position on the supports (FIG. 12). The modules are installed on the GBS supports using vertical jacks integrated into the hydraulic sliders. After that, the sliders are returned to the initial position to move the next module, and when the installation of modules is completed, they are removed from the guides by cranes.

This method of moving the module 12 on the GBS 27 includes three completely independent steps. The lifting system 24 is mounted directly to the bottom of the dry dock 18 or 19, eliminating the installation of additional devices for moving the module to different elevations.

Once all modules are installed, the topside modules are integrated with the GBS and with each other until the process line is complete.

Integration is performed when the GBS with the installed topside modules is in the dry dock. The integration is carried out in three streams: integration of the topside process modules with the GBS, integration of the topside modules among themselves, and the third stream concerns all the electrical work required to ensure the operation of the process train.

The integration phase includes fabrication of tie-in points and additional connecting piping. The integration also includes fabrication and installation of metal structures for flares and ventilation shafts.

This stage is the final one, ensuring the complete readiness of the process line.

Individual tests are carried out simultaneously with integration, after all the process modules have been installed on the GBS. Tests of the process modules are performed in the order of maintenance of each system of the module and comprehensively.

After completion of GBS construction, installation, integration and individual testing of the topsides in the dry dock, a set of marine operations is performed to remove the GBS from the dock, transport it to the installation site and install it on the prepared foundation at the operation site. For this purpose, the dry dock is filled with water, after which a free space with guaranteed depths is provided between the dock water area and the sea water area.

A GBS ballasting/deballasting operation is carried out immediately prior to the GBS leaving the dock. After that, the GBS is taken out of the dock with the help of tugs and towed to the installation site.

Using onshore winches and tugs that restrain the GBS during installation, the GBS is positioned at its destination point at the quayside which ensures GBS connection to onshore utilities in the field area. After confirming the correct position, the GBS is ballasted for installation on a prepared foundation on the bottom of the water body.

The invention claimed is:

1. A method for fabrication of a production complex, in which topside modules are fabricated at a production site, including stages of fabrication, abrasive cleaning and painting of sub-assemblies and assembly of modules, the modules are transported to a location of a foundation and are moved to respective seats on the foundation which is located in a dry dock, and then the modules are integrated with the foundation and with one another, wherein a gravity-based structure (GBS) is used as the foundation, said GBS being able to stay afloat during transportation to a GBS installation site, wherein fabrication of the modules includes the following stages:

Stage I, at which components are fabricated,

Stage II, at which nodes are fabricated from the components,

Stage III, at which sub-assemblies are fabricated from the nodes,

Stage IV, at which abrasive cleaning and painting of the sub-assemblies is carried out, and Stage V, at which assembly of the modules from the sub-assemblies is carried out, then transportation of the modules, movement to their seats on the GBS and their integration include the following stages:

Stage VI, at which the modules are transported to an area adjacent the dry dock with the help of self-propelled vehicles, Stage VII, at which each module is moved onto guides of a lifting system installed in the dry dock, Stage VIII, at which each module is lifted until the lifting system guides are connected with guides on a top slab of the GBS, and Stage IX, at which each module is moved to its seat on the GBS, installed on the GBS, and the modules are integrated with one another and with the GBS.

2. The method according to claim 1, wherein Stage I is implemented at a components fabrication site at which materials and the components are moved along components fabrication lines by means of a lifting and transporting equipment.

3. The method according to claim 2, wherein Stage II is implemented at a site for assembly of the nodes and sub-assemblies, with the lifting and transporting equipment being located at an area at a boundary of the components fabrication site and along the site for assembly of the nodes and sub-assemblies.

4. The method according to claim 3, wherein overhead cranes are used as lifting and transporting equipment in the site for assembly of the nodes and sub-assemblies, and semi-gantry cranes are used in the area at the boundary of the components fabrication site, wherein the components are moved from the components fabrication site to the site for assembly of the nodes and sub-assemblies with self-propelled vehicles, the nodes are fabricated at a nodes fabrication area where the components and nodes are moved with the semi-gantry cranes, and then the nodes are moved to a sub-assemblies fabrication area with the overhead cranes.

5. The method according to claim 4, wherein supports of the semi-gantry cranes are located outside a component movement route from the component fabrication site to the site for assembly of the nodes and sub-assemblies.

6. The method according to claim 4, wherein Stage III is implemented at the sub-assemblies fabrication area of the site for assembly of the nodes and sub-assemblies, where the nodes are moved with the cranes, and then the sub-assemblies are moved by self-propelled vehicles to a sub-assemblies shot blasting and painting site.

7. The method according to claim 6, wherein Stage IV is implemented at the sub-assemblies shot blasting and painting site, and thereafter the sub-assemblies are moved by self-propelled vehicles to a modules assembly site.

8. The method according to claim 7, wherein sub-assemblies are moved from blasting chambers to painting chambers and to the module assembly site through enclosed corridors with roofs and sliding gates.

9. The method according to claim 1, wherein Stage V is implemented at the modules assembly site which has parallel bays, each bay being provided with lifting and transporting equipment to move sub-assemblies along the bays and transversely.

10. The method according to claim 9, wherein each assembly area of the modules assembly site is a slipway with a set of support systems vertically integrated into an inter-column space of the site.

11. The method according to claim 1, wherein at Stage VI, modules fabricated outside the fabrication site are also moved to the area adjacent the dry dock.

12. The method according to claim 11, wherein the modules fabricated outside the fabrication site are shipped to a berth area, from which the modules are moved to the area adjacent the dry dock by self-propelled vehicles after unloading.

13. The method according to claim 1, wherein at Stage VII, each module is moved horizontally onto the guides of the lifting system installed in the dry dock with hydraulic sliders installed on rails.

14. The method according to claim 13, wherein at Stage VIII, each module is lifted with vertical jacks of the lifting system until the lifting system guides and the GBS guides match.

15. The method according to claim 14, wherein at Stage IX, the modules are moved to the seats on the GBS with hydraulic sliders.

16. The method according to claim 1, wherein at Stage IX, the modules are installed on the GBS using vertical jacks integrated into hydraulic sliders.

17. The method according to claim 1, wherein at Stage IX, individual tests are performed in parallel with the integration of the modules with one another and the GBS as a first stage of commissioning works.

* * * * *

UNITED STATES PATENT AND TRADEMARK OFFICE
CERTIFICATE OF CORRECTION

| | | |
|---|---|---|
| PATENT NO. | : 12,103,649 B2 | Page 1 of 1 |
| APPLICATION NO. | : 18/580772 | |
| DATED | : October 1, 2024 | |
| INVENTOR(S) | : Leonid Viktorovich Mikhelson et al. | |

It is certified that error appears in the above-identified patent and that said Letters Patent is hereby corrected as shown below:

In the Claims

In Claim 6 (Column 11, Line 33): before "cranes" please add: -- overhead --

In Claim 9 (Column 12, Line 5): please change: "1" to correctly read: -- 7 --

Signed and Sealed this
Twenty-ninth Day of October, 2024

Katherine Kelly Vidal
*Director of the United States Patent and Trademark Office*